United States Patent
Toulon-Meekhun et al.

(10) Patent No.: US 10,787,947 B2
(45) Date of Patent: Sep. 29, 2020

(54) FLUID SENSOR PROTECTION ASSEMBLY

(71) Applicant: MEAS France, Toulouse (FR)

(72) Inventors: Dariga Toulon-Meekhun, Saint Agne (FR); Vincent Leger, Toulouse (FR); Gael Chavarria, Toulouse (FR)

(73) Assignee: MEAS France, Toulouse (FR)

( * ) Notice: Subject to any disclaimer, the term of this patent is extended or adjusted under 35 U.S.C. 154(b) by 0 days.

(21) Appl. No.: 15/995,658

(22) Filed: Jun. 1, 2018

(65) Prior Publication Data

US 2018/0347436 A1 Dec. 6, 2018

(30) Foreign Application Priority Data

Jun. 2, 2017 (EP) ..................................... 17305646

(51) Int. Cl.
*F01N 13/00* (2010.01)
*F01N 11/00* (2006.01)
(Continued)

(52) U.S. Cl.
CPC ............ *F01N 13/008* (2013.01); *F01N 11/00* (2013.01); *G01F 15/08* (2013.01); *F01N 2490/00* (2013.01); *F01N 2560/02* (2013.01); *F01N 2560/021* (2013.01); *F01N 2610/02* (2013.01); *F01N 2610/148* (2013.01); *F01N 2900/1818* (2013.01); *G01F 23/00* (2013.01)

(58) Field of Classification Search
CPC .... F01N 11/00; F01N 13/008; F01N 2490/00; F01N 2560/02; F01N 2560/021; F01N 2610/02; F01N 2610/148; F01N 2900/1818; G01F 15/08; G01F 23/00
See application file for complete search history.

(56) References Cited

U.S. PATENT DOCUMENTS

| 2007/0110618 | A1* | 5/2007 | Sasanuma | ............... F01N 11/00 422/68.1 |
| 2007/0113625 | A1* | 5/2007 | Sasanuma | ............. F01N 3/2066 73/61.46 |

(Continued)

OTHER PUBLICATIONS

European Search Report, dated Dec. 1, 2017, 8 pages.
European Patent Office Communication, Application No. 17305646.6, dated Oct. 4, 2019, 4 pages.

*Primary Examiner* — Matthew T Largi

(57) ABSTRACT

A fluid sensor protection assembly for protecting a fluid sensor comprises a housing receiving the fluid sensor. The housing includes a bottom wall having a lower inner flow-through opening, a top wall spaced apart from the bottom wall in a vertical direction and having an upper inner flow-through opening, a lower cover member covering the lower inner flow-through opening on an outside of the housing, and an upper cover member covering the upper inner flow-through opening on the outside of the housing. The lower cover member is spaced apart from the lower inner flow-through opening in the vertical direction and forms a lower outer flow-through opening. The upper cover member is spaced apart from the upper inner flow-through opening in the vertical direction and forms an upper outer flow-through opening. A continuous flow-through passage through the housing extends between the lower outer flow-through opening and the upper outer flow-through opening.

22 Claims, 2 Drawing Sheets

(51) Int. Cl.
*G01F 15/08* (2006.01)
*G01F 23/00* (2006.01)

(56) References Cited

U.S. PATENT DOCUMENTS

| | | | |
|---|---|---|---|
| 2007/0202019 A1* | 8/2007 | Nishina | F01N 3/2066 |
| | | | 422/163 |
| 2008/0024792 A1 | 1/2008 | Pendry et al. | |
| 2008/0038153 A1* | 2/2008 | Yamamoto | G01F 23/268 |
| | | | 422/82.12 |
| 2008/0184775 A1* | 8/2008 | Yamagishi | G01N 27/185 |
| | | | 73/25.05 |
| 2008/0247912 A1* | 10/2008 | Izutani | F01N 11/00 |
| | | | 422/82.12 |
| 2011/0301908 A1* | 12/2011 | Magarida | F01N 11/002 |
| | | | 702/130 |
| 2013/0118252 A1* | 5/2013 | Hartmann | G01F 23/296 |
| | | | 73/290 V |
| 2015/0260687 A1 | 9/2015 | Kinoshita et al. | |
| 2015/0306529 A1 | 10/2015 | Yano | |
| 2016/0123929 A1* | 5/2016 | Op De Beeck | G01N 29/02 |
| | | | 73/632 |
| 2018/0252134 A1* | 9/2018 | Leger | F01N 3/2066 |

* cited by examiner

_US 10,787,947 B2_

FLUID SENSOR PROTECTION ASSEMBLY

CROSS-REFERENCE TO RELATED APPLICATION

This application claims the benefit of the filing date under 35 U.S.C. § 119(a)-(d) of European Patent Application No. 17305646.6, filed on Jun. 2, 2017.

FIELD OF THE INVENTION

The present invention relates to a fluid sensor protection assembly and, more particularly, to a fluid sensor protection assembly for protecting a fluid sensor of a fluid sensor system against bubbles and/or particles.

BACKGROUND

Known fluid sensor systems are generally used in tanks for fluids, such as a diesel exhaust fluid (DEF) for diesel engines or oil-based fluids. Fluid sensors of the systems are used for monitoring certain properties of the fluid in order to analyze the quality of the solution. However, certain circumstances may negatively influence the measurements. Some fluids create bubbles during movement, for example, during filling of the tank or in conditions causing vibration. These bubbles may influence measurements of the fluid sensor.

The fluid sensors which are typically used can be of different types, including ultrasonic sensors or optical sensors, such as infrared sensors. These sensors are often used for measuring the speed of sound or light in the fluid and/or for measuring the density of the fluid. These measurements can be used for determining the quality and/or the filling level of the fluid in the tank. Bubbles in the fluid negatively influence these kind of measurements.

Particles formed by debris or frozen urea solution may also disturb measurements of the fluid sensor. Known sensor protection assemblies use filter members such as mesh material or semi-permeable membranes to protect a sensor while allowing fluid to reach the sensor. These assemblies are useful and provide good protection to a fluid sensor. However, these assemblies usually require a large number of parts and are, consequently, time and cost consuming to produce.

SUMMARY

A fluid sensor protection assembly for protecting a fluid sensor comprises a housing receiving the fluid sensor. The housing includes a bottom wall having a lower inner flow-through opening, a top wall spaced apart from the bottom wall in a vertical direction and having an upper inner flow-through opening, a lower cover member covering the lower inner flow-through opening on an outside of the housing, and an upper cover member covering the upper inner flow-through opening on the outside of the housing. The lower cover member is spaced apart from the lower inner flow-through opening in the vertical direction and forms a lower outer flow-through opening. The upper cover member is spaced apart from the upper inner flow-through opening in the vertical direction and forms an upper outer flow-through opening. A continuous flow-through passage through the housing extends between the lower outer flow-through opening and the upper outer flow-through opening.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
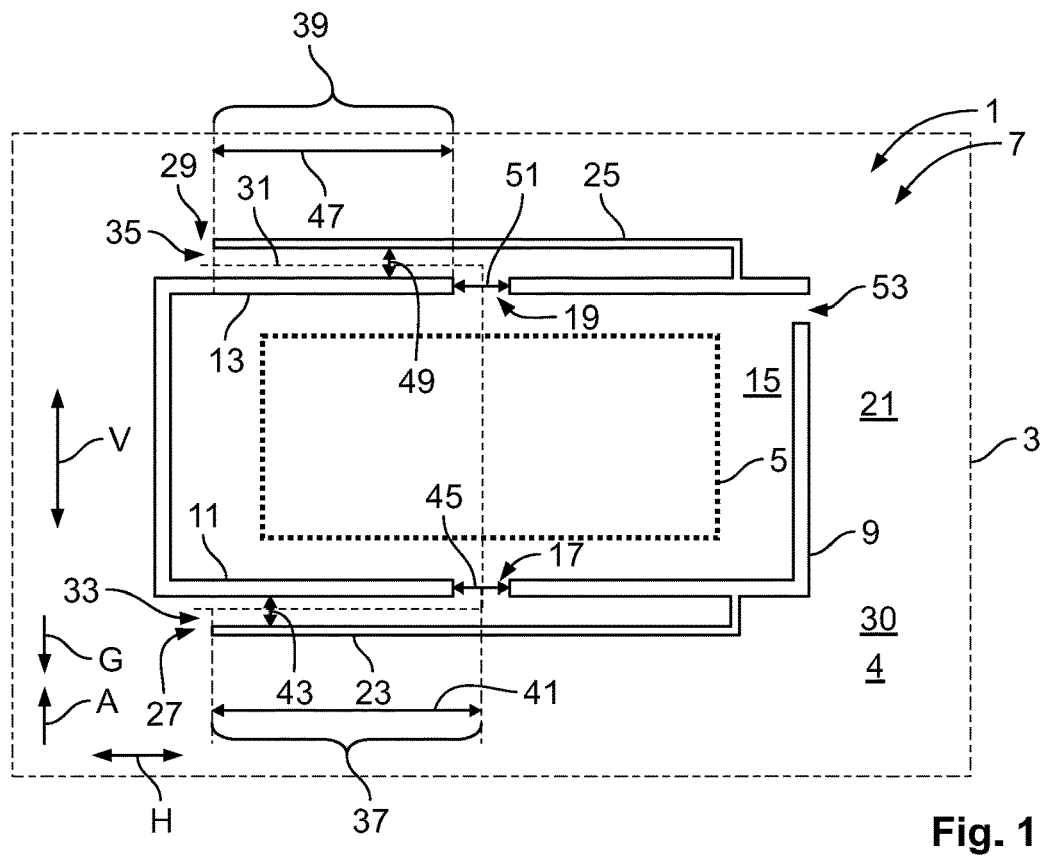
FIG. 1 is a sectional front view of a fluid sensor system with a fluid sensor protection assembly according to an embodiment.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A fluid sensor protection assembly 1 according to an embodiment is shown in FIG. 1. The assembly 1 is used in a tank 3 containing a solution 4. In an embodiment, the solution 4 is a urea solution such as diesel exhaust fluid (DEF). The assembly 1 protects a fluid sensor 5; the assembly 1 and the fluid sensor 5 together form a fluid sensor system 7.

The fluid sensor 5 is a quality sensor adapted to analyze the quality of the solution 4 in the tank 3. In various embodiments, the fluid sensor 5 is an optical sensor or an ultrasonic sensor. In other embodiments, the fluid sensor 5 may be any other type of sensor or a combination of different sensor types known to those with ordinary skill in the art.

The assembly 1, as shown in FIG. 1, includes a housing 9 receiving the fluid sensor 5. The housing 9 is adapted for supporting and fixing the fluid sensor 5. The housing 9 encases the fluid sensor 5. In an alternative embodiment, wall sections of the fluid sensor 5 form a part of the housing 9. The housing 9 includes a bottom wall 11 and a top wall 13; the terms "top" and "bottom" refer to a vertical direction V. The vertical direction V is parallel with a gravitational direction G. Due to the properties of gas bubbles in the solution 4, the gravitational direction G is opposite to a bubble ascension direction A. The vertical direction V is perpendicular to a horizontal direction H.

The bottom wall 11 and the top wall 13 are spaced apart from each other in the vertical direction V and define a sensor volume 15 in which the at least one fluid sensor 5 is received, as shown in FIG. 1. The bottom wall 11 has a lower inner flow-through opening 17 and the top wall 13 has an upper inner flow-through opening 19. In other embodiments, each of the walls 11 and 13 may have more than one opening. The solution 4 may enter and exit the housing 9 through the openings 17 and 19 in order to be analyzed by the fluid sensor 5. When the assembly 1 is used, the sensor volume 15 is completely filled with solution 4 and a continuous exchange of solution 4 between the sensor volume 15 and the outside 21 of the housing 9 within the tank 3 is enabled by the openings 17 and 19.

In an embodiment, the upper inner flow-through opening 19 is arranged and sized similar to the lower inner flow-through opening 17; the upper inner flow-through opening 19 and the lower inner flow-through opening 17 are arranged and sized such that they are mirror symmetrical with each other with respect to a mirror plane of symmetry which extends parallel with the horizontal direction H between the bottom wall 11 and the top wall 13.

As shown in FIG. 1, the lower inner flow-through opening 17 is covered on the outside 21 of the housing 9 by a lower cover member 23 and the upper inner flow-through opening 19 is covered on the outside 21 of the housing 9 by an upper cover member 25. The cover members 23 and 25 are each spaced apart from the corresponding flow-through openings 17 and 19 in the vertical direction V. The lower cover member 23 forms a lower outer flow-through opening 27 and the upper cover member 25 forms an upper outer flow-through opening 29. The outer flow-through openings 27 and 29 allow the exchange of solution 4 between the outside 30 of the assembly 1 within the tank 3 and the sensor volume 15. In an embodiment, the outer flow-through openings 27 and 29 each have a slit shape with a height measured along the vertical direction V between 1 and 2 mm. In other embodiments, the height of each of the outer flow-through openings 27 and 29 may be 1.3-1.7 mm or 1.4-1.6 mm.

A continuous flow-through passage 31 shown in FIG. 1 extends between the lower outer flow-through opening 27 and the upper outer flow-through opening 29. Along the continuous flow-through passage 31, solution 4 passes through the assembly 1 in order to be analyzed by the fluid sensor 5. The passage 31 provides an unobstructed path for the solution 4. The continuous flow-through passage 31 passes the sensor volume 15. In an embodiment, the continuous flow-through passage 31 passes the sensor volume 15 in a center region of the sensor volume 15 with respect to the horizontal direction H.

The continuous flow-through passage 31 meanders through the assembly 1 along a zigzag course, which helps prevent bubbles from entering the sensor volume 15. Such course is achieved by the cover members 23 and 25 which cover the openings 17 and 19 and overlap with the openings 17 and 19 in the vertical direction V. The flow-through openings 17 and 19 prevent the intake of gas bubbles into the housing 9 while the continuous flow-through passage 31 provides a flow of solution 4 through the housing 9. The assembly 1 does not require a filter member such as a mesh material or a semi permeable membrane, however, this does not exclude using such filter members in the assembly 1.

As shown in FIG. 1, the lower outer flow-through opening 27 is formed as a lower gap 33 between the bottom wall 11 and the lower cover member 23. The upper outer flow-through opening 29 is formed as an upper gap 35 between the top wall 13 and the upper cover member 25. In order to provide a continuous flow of solution 4 along the continuous flow-through passage 31 through the assembly 1, the lower inner flow-through opening 17 is aligned with the upper inner flow-through opening 19 in the vertical direction V. This alignment helps remove gas bubbles which, for example, enter the housing 9 through the lower inner flow-through opening 17. Since gas bubbles will ascend along the bubble ascension direction A, the bubbles will directly flow towards the upper inner flow-through opening 19 and leave the housing 9.

A lower section 37 of the continuous flow-through passage 31 extends essentially horizontally from the lower inner flow-through opening 17 to the lower outer flow-through opening 27 between the bottom wall 11 and the lower cover member 23. An upper section 39 of the continuous flow-through passage 31 extends essentially horizontally from the upper inner flow-through opening 19 to the upper outer flow-through opening 29 between the top wall 13 and the upper cover member 25. For the purposes of this description, the term "essentially horizontal" refers to deviations from an exact horizontal alignment of up to 5°.

In the embodiment shown in FIG. 1, the lower section 37 has a section length 41 measured perpendicular to the vertical direction V from the lower inner flow-through opening 17 to the lower outer flow-through opening 27 that is larger than a distance 43 between the bottom wall 11 and the lower cover member 23. Additionally or alternatively, the section length 41 is larger than the diameter 45 of the lower inner flow-through opening 17. The upper section 39 has a section length 47 larger than the distance 49 between the top wall 13 and the upper cover member 25 and/or larger than the diameter 51 of the upper inner flow-through opening 19. In other embodiments, at least one of the sections 37 and 39 has a section length 41 and 47 that is 1.5 times, at least two times, at least three times, or four or more times the smallest distance between the cover member 23 and 25 and its corresponding wall 11 and 13. At least one of the sections 37 and 39 has a section length 41 and 47 that is, in various embodiments, 1.3 times, 1.5 times, at least two times, at least three times, or four or more times the diameter of its corresponding flow-through opening 17 and 19. At least one of the sections 37 and 39 may have a section length 41 and 47 that is at least 4 mm, at least 5 mm, or at least 6 mm measured along the horizontal direction H.

In order to allow gas bubbles which have accumulated in the housing 9, in particular in the sensor volume 15, to leave the housing 9, the housing 9 has at least one bubble outlet opening 53 shown in FIG. 1 which opens the housing 9 to the outside 30 of the assembly 1. The bubble outlet opening 53 is arranged adjacent to the top wall 13. Because gas bubbles tend to ascend along the bubble ascension direction A, these bubbles will most likely accumulate under the top wall 13; the arrangement of the bubble outlet opening 53 adjacent to the top wall 13 easily vents the gas bubbles. In other embodiments, the bubble outlet opening 53 may be omitted.

The at least one bubble outlet opening 53 has a height measured along the vertical direction V which is between 0.5 and 1.5 mm, or 0.8 to 1.2 mm. The bubble outlet opening 53 may have the shape of a slit which extends along the horizontal direction H. The width of the slit measured parallel with the horizontal direction H may be larger than the height; in an embodiment, the width of the bubble outlet opening 53 is larger than 8 mm.

In the embodiment shown in FIG. 1, at least one of the cover members 23 and 25 is formed monolithically with its corresponding wall 11 or 13. Alternatively, at least one of the cover members 23 and 25 is attached to the housing 9 or may just be arranged outside the housing 9 and kept in place by being fixed to the tank 3 or another part of the fluid sensor system 7. In an alternative embodiment, at least one of the cover members 23 or 25 is part of an outer housing which at least partially surrounds the housing 9.

In various embodiments, at least one of the openings 17, 19, 27, and 29 has a circular shape and a diameter of 2 to 3 mm, 2.2 to 2.8 mm, 2.4 to 2.6 mm, 3.5 to 4.5 mm, 3.7 to 4.3 mm, or 3.9 to 4.1 mm. In other embodiments, at least one of the openings 17, 19, 27, and 29 has a slit shape with a length of 10 to 14 mm, 11 to 13 mm, or 11.5 to 12.5 mm and a width of 3.5 to 4.5 mm, 3.7 to 4.3 mm, or 3.9 to 4.1 mm.

In an embodiment, at least one of the openings 17, 19, 27, 29 and 53 has a cross-sectional shape that tapers in a direction toward the outside 30 to prevent entrance of bubbles into the housing 9; such an opening has a cross-sectional shape that is similar to a funnel, wherein the wide side of the funnel shape is arranged towards the sensor volume 15 and the narrow side of the funnel shape is arranged towards the outside 30.

Figure 2:
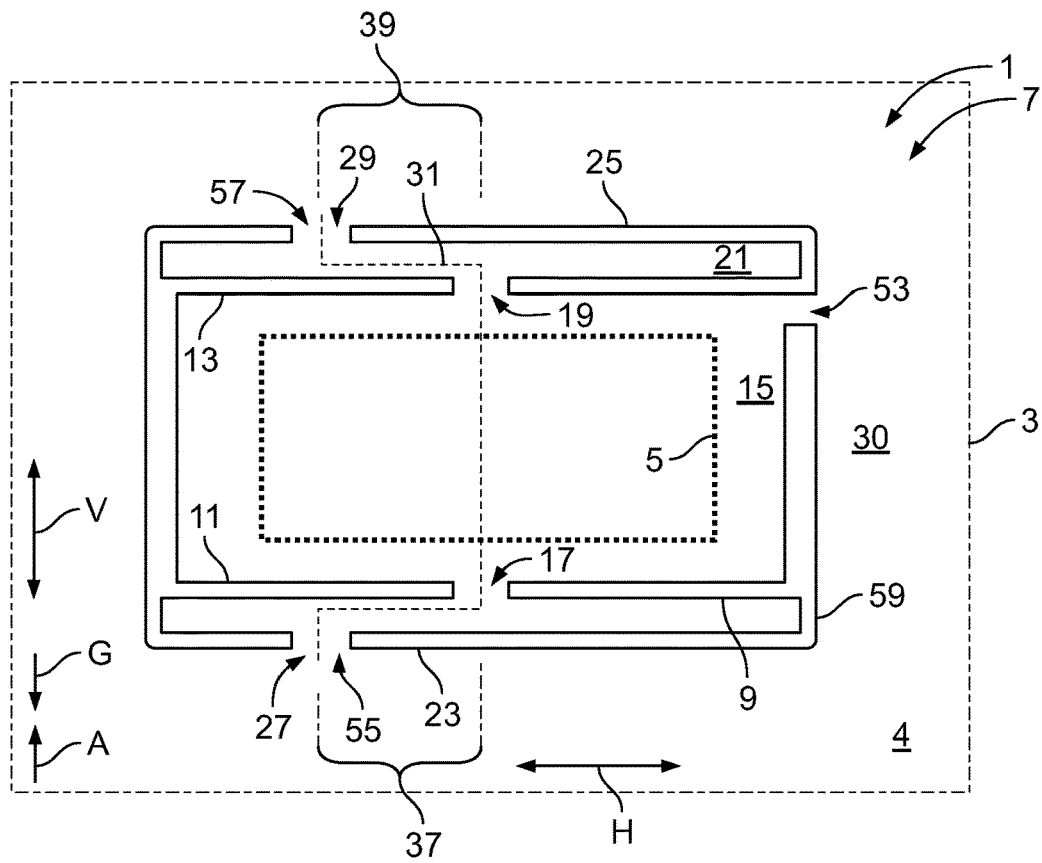
FIG. 2 is a sectional front view of a fluid sensor system with a fluid sensor protection assembly according to another embodiment.

A fluid sensor protection assembly 1 and a fluid sensor system 7 according to another embodiment are shown in FIG. 2. Like reference numbers refer to like elements and only the differences with respect to the embodiment shown in FIG. 1 will be described in detail herein.

The second embodiment differs from the first embodiment in that the cover members 23 and 25 have outer flow-through openings 27 and 29 that are formed as passageways 55 and 57 in the cover members 23 and 25. The continuous flow-through passage 31 extends through the passageways 55 and 57 in the vertical direction V. In the embodiment shown in FIG. 2, the cover members 23 and 25 are part of an outer housing 59 which surrounds the housing 9. In the case that the assembly 1 according to the second embodiment has a bubble outlet opening 53, the opening 53 is formed as a through hole which extends through the housing 9 and the outer housing 59.

Figure 3:
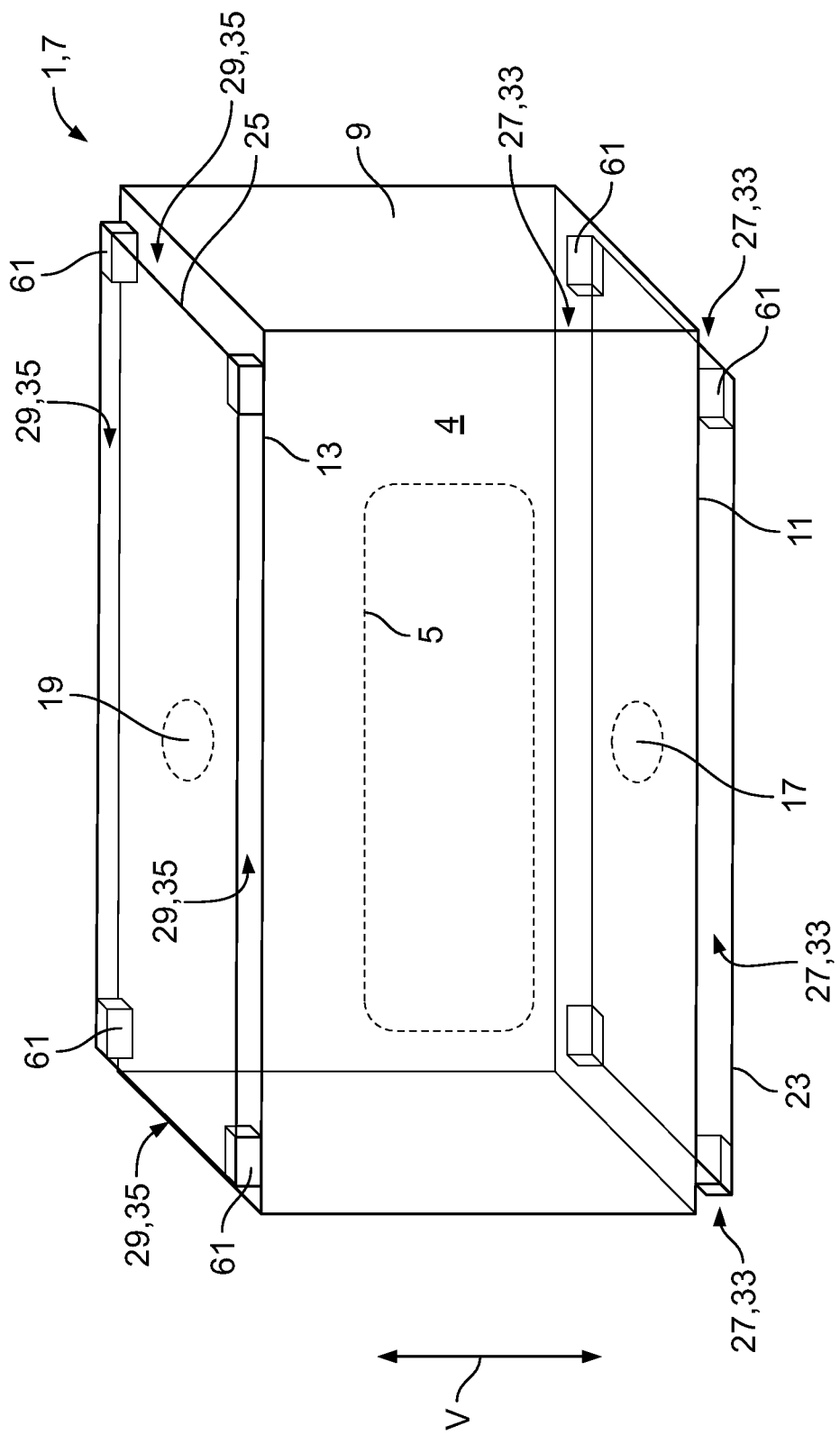
FIG. 3 is a perspective view of a fluid sensor system with a fluid sensor protection assembly according to another embodiment.

A fluid sensor protection assembly 1 and a fluid sensor system 7 according to another embodiment are shown in FIG. 3. Like reference numbers refer to like elements and only the differences with respect to the embodiments shown in FIGS. 1 and 2 will be described in detail herein.

The assembly 1 according to the third embodiment, as shown in FIG. 3, has cover members 23 and 25 that have overall plate-like shapes and are attached to the housing 9 such that they are spaced apart from their corresponding wall 11 and 13 by spacers 61. The spacers 61 may be formed monolithically with the housing 9, with the cover members 23 or 25 or, alternatively, as separate parts which are fixed between the housing 9 and the cover members 23.

As shown in FIG. 3, the inner flow-through openings 17 and 19 are arranged in a central region of the walls 11 and 13 perpendicular to the vertical direction V. On every side of the cover members 23 and 25 perpendicular to the vertical direction V, outer flow-through openings 29 and 31 are formed. The outer flow-through openings 29 and 31 each have a slit-like shape and are formed as gaps 33 and 35 between the cover members 23 and 25 and the corresponding walls 11 and 13. As a consequence, the continuous flow-through passage 31 extends such that solution 4 may flow around the plate-like cover members 23 and 25 on its way to and from the inner flow-through openings 17 and 19. In an alternative embodiment, the cover members 23 or 25 may be arranged such that they do not form outer flow-through openings 29 and 31 on each side, but only on one, two or three sides.

The assembly 1 may have a combination of the embodiments described above. For example, the assembly 1 could have with a lower outer flow-through opening 27 that is provided as a through hole in the lower cover member 23 according to the second embodiment and an upper outer flow-through opening 29 that is formed according to the first or third embodiment.

What is claimed is:

1. A fluid sensor protection assembly for protecting a fluid sensor of a fluid sensor system, comprising:
    a housing receiving the fluid sensor and including:
        a bottom wall having a lower inner flow-through opening;
        a top wall spaced apart from the bottom wall in a vertical direction and having an upper inner flow-through opening;
        a lower cover member extending from the bottom wall and covering the lower inner flow-through opening on an outside of the housing, the lower cover member spaced apart from the lower inner flow-through opening in the vertical direction and forming a lower outer flow-through opening; and
        an upper cover member extending from the top wall and covering the upper inner flow-through opening on the outside of the housing, the upper cover member spaced apart from the upper inner flow-through opening in the vertical direction and forming an upper outer flow-through opening, a continuous flow-through passage through the housing extends between the lower outer flow-through opening and the upper outer flow-through opening.

2. The fluid sensor protection assembly of claim 1, wherein the lower outer flow-through opening is formed between the bottom wall and the lower cover member.

3. The fluid sensor protection assembly of claim 2, wherein the upper outer flow-through opening is formed between the top wall and the upper cover member.

4. The fluid sensor protection assembly of claim 1, wherein the lower outer flow-through opening is a passageway extending through the lower cover member.

5. The fluid sensor protection assembly of claim 1, wherein the upper outer flow-through opening is a passageway extending through the upper cover member.

6. The fluid sensor protection assembly of claim 1, wherein a lower section of the continuous flow-through passage extends essentially horizontally from the lower inner flow-through opening to the lower outer flow-through opening.

7. The fluid sensor protection assembly of claim 6, wherein an upper section of the continuous flow-through passage extends essentially horizontally from the upper inner flow-through opening to the upper outer flow-through opening.

8. The fluid sensor protection assembly of claim 7, wherein the lower section has a lower section length that is at least 1.5 times a smallest distance between the lower cover member and the bottom wall and/or the upper section has an upper section length that is at least 1.5 times a smallest distance between the upper cover member and the top wall.

9. The fluid sensor protection assembly of claim 7, wherein the lower section length is at least 1.5 times a diameter of the lower inner flow-through opening and/or the upper section length is at least 1.5 times a diameter of the upper inner flow-through opening.

10. The fluid sensor protection assembly of claim 1, wherein the upper inner flow-through opening and the lower inner flow-through opening are aligned with each other in the vertical direction.

11. The fluid sensor protection assembly of claim 1, wherein the housing has a bubble outlet opening that opens the housing to an outside of the assembly.

12. The fluid sensor protection assembly of claim 11, wherein the bubble outlet opening is disposed in a portion of the housing that extends in the vertical direction between the bottom wall and the top wall.

13. The fluid sensor protection assembly of claim 11, wherein the bubble outlet opening is disposed adjacent the top wall.

14. The fluid sensor protection assembly of claim 1, wherein at least one of the lower cover member and the upper cover member is monolithically formed with the housing.

15. The fluid sensor protection assembly of claim 1, wherein at least one of the lower cover member and the upper cover member is formed by an outer housing which at least partially surrounds the housing.

16. The fluid sensor protection assembly of claim 1, wherein the lower inner flow-through opening has a cross-section that tapers along the vertical direction toward the lower cover member and/or the upper inner flow-through opening has a cross-section that tapers along the vertical direction toward the upper cover member.

17. The fluid sensor protection assembly of claim 1, wherein the bottom wall and the top wall extend parallel to each other in a horizontal direction perpendicular to the vertical direction.

18. The fluid sensor protection assembly of claim 17, wherein the lower cover member and the upper cover member extend parallel to each other.

19. The fluid sensor protection assembly of claim 18, wherein the lower cover member and the upper cover member extend parallel to the bottom wall and the top wall.

20. The fluid sensor protection assembly of claim 17, wherein each of the lower cover member and the upper cover member has a plate-like shape.

21. The fluid sensor protection assembly of claim 1, wherein the bottom wall, the top wall, the lower cover member, and the upper cover member are monolithically formed.

22. A fluid sensor system, comprising:
a fluid sensor; and
a fluid sensor protection assembly including a housing receiving the fluid sensor, the housing having:
 a bottom wall having a lower inner flow-through opening;
 a top wall spaced apart from the bottom wall in a vertical direction and having an upper inner flow-through opening;
 a lower cover member extending from the bottom wall and covering the lower inner flow-through opening on an outside of the housing, the lower cover member spaced apart from the lower inner flow-through opening in the vertical direction and forming a lower outer flow-through opening; and
 an upper cover member extending from the top wall and covering the upper inner flow-through opening on the outside of the housing, the upper cover member spaced apart from the upper inner flow-through opening in the vertical direction and forming an upper outer flow-through opening, a continuous flow-through passage through the housing extends between the lower outer flow-through opening and the upper outer flow-through opening.

* * * * *